Figure 1:
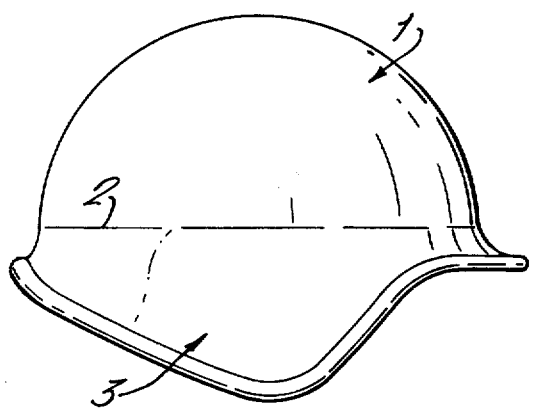

United States Patent [19]  [11] 3,935,044
Daly  [45] Jan. 27, 1976

[54] METHOD OF MANUFACTURING IMPROVED PROTECTIVE HEADGEAR

[76] Inventor: Noel Daly, 41A Young St., New Plymouth, New Zealand

[22] Filed: Mar. 18, 1974

[21] Appl. No.: 452,397

Related U.S. Application Data

[62] Division of Ser. No. 246,581, April 24, 1972, abandoned.

[30] Foreign Application Priority Data

Dec. 23, 1971 New Zealand ..................... 165908

[52] U.S. Cl. ..................... 156/79; 2/3 R; 264/45.4; 264/51; 264/321; 428/315; 428/322; 156/250
[51] Int. Cl.² ......................................... B32B 5/20
[58] Field of Search ................. 156/79, 250; 2/3 R; 264/45, 51, 53, 45.4, 321; 161/159, 160, 161

[56] References Cited
UNITED STATES PATENTS

| | | | |
|---|---|---|---|
| 2,814,043 | 1/1957 | Alesi | 2/3 R |
| 2,901,750 | 9/1959 | McMurray | 2/3 R |
| 3,273,162 | 9/1966 | Andrews | 2/3 R |
| 3,277,220 | 10/1966 | Plymale et al. | 264/45.4 |
| 3,344,222 | 9/1967 | Shapiro et al. | 156/79 X |
| 3,465,363 | 9/1969 | Raney | 2/3 R |
| 3,471,866 | 10/1969 | Raney | 2/3 R |
| 3,624,663 | 11/1971 | Jones | 2/3 R |
| 3,627,162 | 12/1971 | Dossin | 264/45 X |
| 3,684,633 | 8/1972 | Haase | 161/161 |
| 3,691,265 | 9/1972 | Cobbledick | 161/161 |

FOREIGN PATENTS OR APPLICATIONS

| | | | |
|---|---|---|---|
| 670,830 | 9/1963 | Canada | 264/45.4 |
| 1,326,192 | 8/1973 | United Kingdom | 264/45.4 |

*Primary Examiner*—Edward G. Whitby
*Attorney, Agent, or Firm*—Holman & Stern

[57] ABSTRACT

A method is disclosed for producing a protective helmet, the method comprising placing an inner shell having a dome portion and downwardly extending side portions on a die, positioning a further die so that a cavity is provided between the outer surface of the inner shell and the further die, filling the cavity with pre-foamed beads of polystyrene of selected density, and applying heat to expand the beads to create a continuous layer of shock absorbing material extending over the whole outer surface of the inner shell. Additionally, and subsequent to the formation of the layer of shock absorbing material, an outer covering may be applied to the outer surface of the shock absorbing material to provide a double-skin helmet.

7 Claims, 9 Drawing Figures

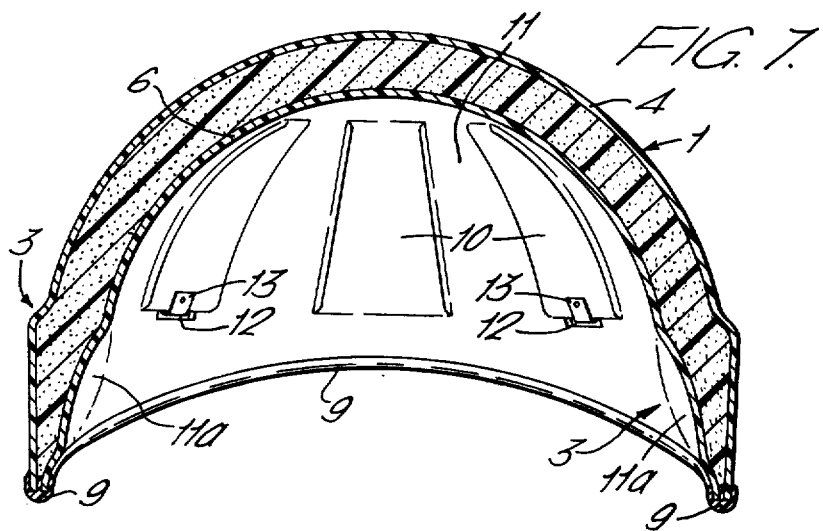
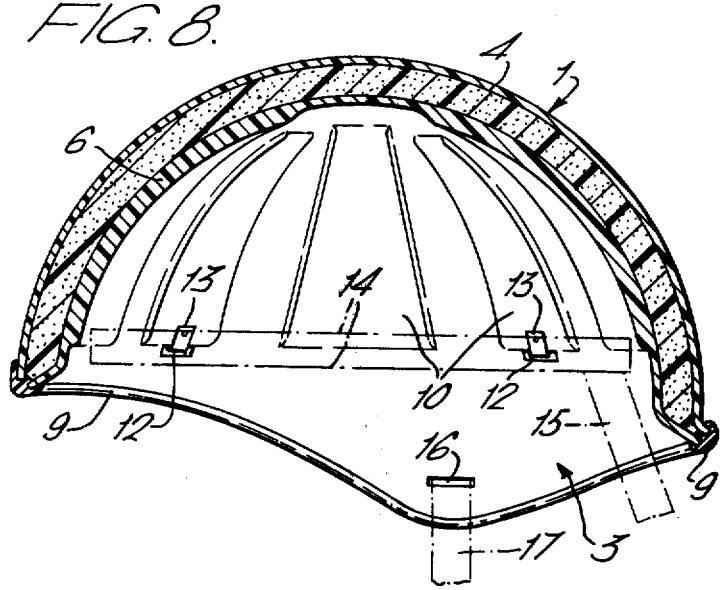
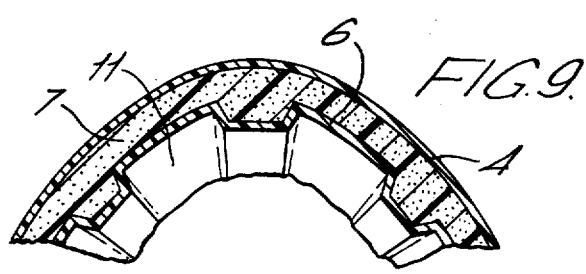

METHOD OF MANUFACTURING IMPROVED PROTECTIVE HEADGEAR

This is a divisional, of application Ser. No. 246,581, filed Apr. 24, 1972 now abandoned.

BACKGROUND OF THE INVENTION

This invention relates to protective helmets used in industry, the armed forces, and as used as crash helmets, equestrian helmets, climbing helmets and like helmets where it is desirable to provide a protective barrier between the head of a wearer and any means whereby the head of the wearer may be injured, and is particularly concerned with a novel manufacturing method therefor.

It is known to provide a protective helmet having a shell made from metal or made from synthetic resin materials and having fixed or otherwise fastened within the interior of the shell either a sling or harness of webbing or other material fastened to the lower edge portion of the shell, the dimensions and arrangement of the webbing being such that when the webbing is in contact with the head of a wearer there is provided a clearance between the shell and said head; or, the interior of the shell may be provided with protective padding fixed or secured in some manner to the shell, the padding being arranged to bear against the head of a wearer.

It is further known that the most vunerable parts of the human head are the flat portions immediately above and about the ear. It is also known that many impacts whether to vehicle users, sportsmen or industrial users, occur in and about this area. Hitherto protection of these areas has not been satisfactorily achieved.

In protective helmets generally, the protection provided terminates at the "headband" line, that is on a line passing approximately medially through the temporal and occipital areas of the skull, and if any further covering is provided and does extend downwardly below the headband line in an attempt to cover more adequately the beforementioned areas then this covering is found weak when compared with the strength of the dome structure of the helmet.

DESCRIPTION OF THE INVENTION

It is one of the objects of this invention to provide a novel method of manufacturing forms of protective helmets each having in structural composition, continuity of strength with little if any depreciation from the crown of the helmet into and encompassing further areas of the helmet covering the temporal and occipital areas of the head.

Further objects of the invention will be apparent from the following description.

The invention provides for the manufacture a protective helmet comprising a dome portion and downwardly extending side portions consisting of spaced inner and outer shells or coverings and a continuous layer of shock absorbing material or padding occupying said space, the shells and shock absorbing material being structurally continuous from crown to perimeter thereby maintaining continuity of strength and shock absorbing capacity from crown to terminal of each side portion such that the shells and said material in combination provides a stable shock absorbing structure.

The inventive method may be used to provide a helmet having only an inner shell and overlying padding as will be explained, or to provide what may be termed a double-skin construction formed from the aforesaid inner and outer shells, or coverings the shells being molded from synthetic material, the inner having shell dimensions smaller than the outer covering so as to provide a space therebetween, this space being filled in its entirety with a polyurethane or polystyrene foam core or padding of a selected density and thickness depending upon the distance between the facing surfaces of the inner and outer shells, sufficient to provide the amount of shock absorption required for a particular type of protective helmet. The layers so provided may be or may not be bonded together. By bonding the spaced inner and outer shells together with one lightweight shock absorbing material, all three elements of the finished helmet contribute to the physical strength of the structure, and the performance is improved considerably due to the high strength/weight ratio achieved. It is also envisaged that through control of the various combinations of weight, thickness of outer shell and thickness of inner shell, specific characteristics can be obtained. The edges or rims of either one or both of the shells can be heat formed to provide a welded bead, or alternatively an extruded plastic or rubber edging or bead can be used, which edging is welded, cemented or otherwise attached between the matching edges of the two shells to provide a space between them. This latter space, which may be narrower than the space extending between the dome and sides of the shells can also be filled with the shock absorbing material, thereby providing greater flexural strength around the edges of the structure by virtue of the double-skin effect. The outer edge of the edging provides a finishing bead around the edge or rim of the helmet.

Referring more specifically to the shells, the interior shell can be made from one of a variety of plastics materials, either by thermo-forming or injection molding or rotational casting. The inner shell generally needs to be non-brittle and preferably resistant to body oils and perspiration as well as being compatible with the type of shock absorbing material used to fill the space between the shells, or suitable for cementing to the shock absorbing core.

The outer shell or covering requires to be tough and non brittle and also smooth and unaffected by water. It can be made by injection molding or thermo-forming, or by vacuum forming or by rotational casting, or by the use of reinforced plastics material. The material for the outer shell should be compatible with the type of shock absorbing material used in forming the core, or be suitable for cementing to the core, and the outer shell can be self-coloured or covered with a paint or a plastic film. The outer shell primarily or covering serves to spread the load of any shock over a larger area and also protects the core and other components of the helmet from mechanical damage.

The inner shell, as before described, is molded or otherwise formed to closely follow the general contours of the head of a person. The inner shell acts as a protective containing barrier for the core or layer of shock absorbing material and assists in distributing shock over all or nearly all of the helmet.

The portions of the inner shell in the vicinity of the ears may be shaped or flared away to provide comfortable accommodation for the ears whilst the contour of the remainder of the inner shell follows closely that of a wearer's head. This also provides for good aural access for the ears even though they are well within the protected area.

One method of constructing the helmet consists of vacuum forming the inner and outer shells, placing the inner shell in a die such as an aluminium die, with a mating half providing a cavity of the same dimension as the final core, and filling the cavity with pre-foamed beads of selected predetermined density. Applying heat such as by a short period in steam at say 7lbs per square inch expands the beads to fill the cavity and create a homogenous mass physically adhered to the inner shell. This unit or intermediate product comprising an inner shell and expanded polystyrene padding over its outer surface is then fitted with mounting lugs and slots for accommodating the fastening of a headband within the shell, the intermediate product having a separate utility of its own in that the protective effects of the additional outer shell or coverings may not be necessary in certain applications. Alternatively the unit may then be finally mated to an outer shell. The perimetrical edges of the shells may be held together by means of an added rubber or plastics edging or molding. One of the advantages of the aforegoing method is that some reverse taper can be imparted to the sides of the outer shell at the ear position, which is important for overall appearance. This method also provides a means of providing mounting points for a head-band and a means for fitting a chinstrap in such a way that no piercing of the outer shell is required, thus protecting the wearer from both the effects of blows to the head and the hazard of electric shock. A suitable material for the shells is found at present to be A. B. S., but so long as the physical requirements are met, quite a wide range of plastics materials can be used. In the same way, the shock absorbing material can be expanded polystyrene steamformed in a separate die or polyurethane 2 liquid foam molded in situ between two shells, or molded and assembled separately.

Where the shock attenuation requirement is high, such as for example for aircraft pilots helmets, racing car drivers helmets and motor cyclists helmets, the outer shell would be provided and can be made of reinforced plastics material such as synthetic resin and fibreglass to provide greater strength in the outer shell.

For helmets requiring a lesser degree of shock absorption, such as equestrian helmets, the thickness of both inner and outer shell can be reduced with a consequent saving in weight.

A further advantage in the construction of the helmet of this invention is that the helmet is of a positive buoyancy when fully submerged in water and as will be appreciated, this advantage is of importance to the wearers of helmets in water sports.

The helmet may be provided with an occipital strap which preferably is adjustable or is elastic in nature. The strap can be fixed through the inner shell and anchored in the shock absorbing material. Alternatively the helmet may be provided with a head-band which includes at the rear an adjustable occipital strap, the head-band adjustable or fixed size, being secured in relation to the helmet by lugs or ears passing through slits in the inner shell, the roots of the lugs or ears being embedded in the shock absorbing material. Chin straps if desired can be fitted through a slot on each side of the inner skin of the helmet and held in position by such as a keeper bar or by embedding in the shock absorbing material. In this arrangement one slot is large enough to allow the hook, or similar fastening on a long strap to pass through, and a short strap has a removable buckle, allowing the strap to be removed and refitted as required.

Economical production of the helmets constructed according to this invention can be met by using thermoforming or vacuum-forming techniques in which sheet material of approximately 0.100 of an inch is used to form an outer shell of the required dimensions and shape, using relatively inexpensive apparatus and molds. A shell so formed is then held in a suitable outer mold. The inner shell, mounted on a matching inner mold, is then clamped in position within the outer shell. The constituents of the shock absorbing material are injected into the space between in a measured amount to produce a foam or expanded material of the required density. Such material sets and adheres to the surfaces of the two shells and produces a very high strength/weight ratio. Furthermore the two shells can also be cemented to a previously molded shock absorbing core.

The inner shell, if desired, can be provided with what may be termed a comfort padding which will be a soft resilient padding used to absorb differences in head contours and provide a comfortable fit, and also if necessary provide for ventilation. This padding may be provided for as follows.

The surface of the inner shell intended to face the head of the wearer of the helmet may be provided with a plurality of partitions or ribs or like raised portions extending from the surfaces of the shell. These partitions or ribs add strength to the inner shell and to the helmet as a whole. The partitions or ribs in forming inter-connecting passages leading from or near the edges of the inner liner provide for ventilation. Covering the inwardly facing surfaces of the partitions there may be resilient material such that said material is positioned between the inner shell and the head of a wearer when the headwear is in use. A membrane or impervious material, which is resistant to oil and perspiration may be provided and placed over the resilient material thereby providing a barrier between said resilient material and the head of a wearer when the headwear is in use.

The whole of the inside of the inner shell can be covered with a suitable material to give adequate protection from wear and tear, effects of oil, perspiration and like liquids or substances, and/or to enhance the The invention will now further be described by way of example with reference to the accompanying drawings comprising FIGS. 1 to 9; more particularly, one method of constructing a protective helmet in accordance with this invention is illustrated by way of example in the diagrammatic views, Numbers 1 to 6 inclusive.

Figure 2:
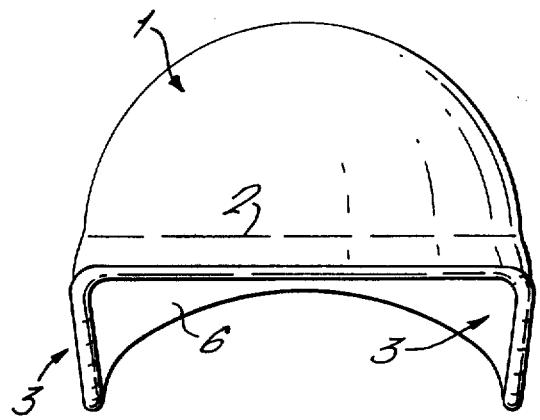
Figure 3:
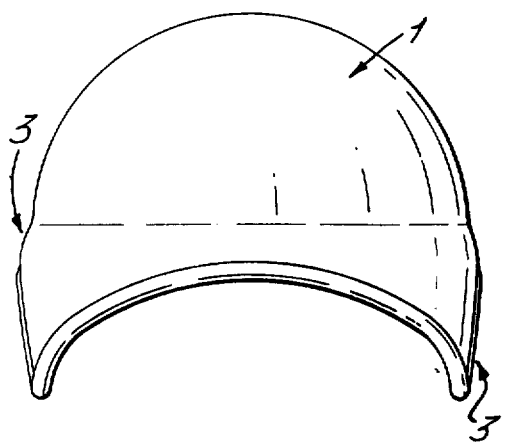

FIGS. 1, 2 and 3 respectively show a preferred shape of helmet, FIG. 1 being a side view, FIG. 2 being a view looking at the front of the helmet, and FIG. 3 being a view looking at the back of the helmet.

The dome portion 1 of the helmet which can be said to be that portion above interrupted line 2 extends downwardly, particularly at the sides, and to a certain extent at the rear to provide side portions 3. As will be seen, the portion of the helmet below line 2 provides optimum protection for the temporal and occipital areas of the skull.

Figure 4:
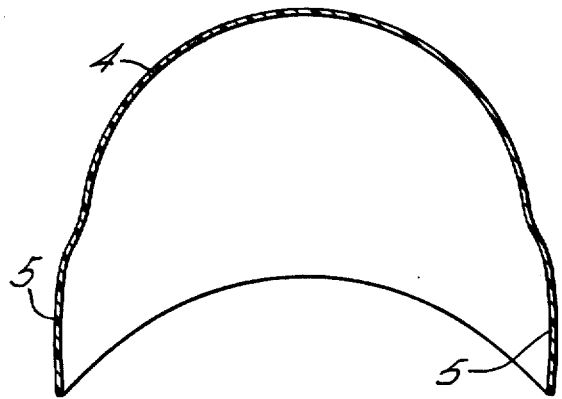

FIG. 4, diagrammatically shows in cross section, an outer shell designated numeral 4, the side portions 5 of outer shell 4 having a slight draft.

Figure 5:
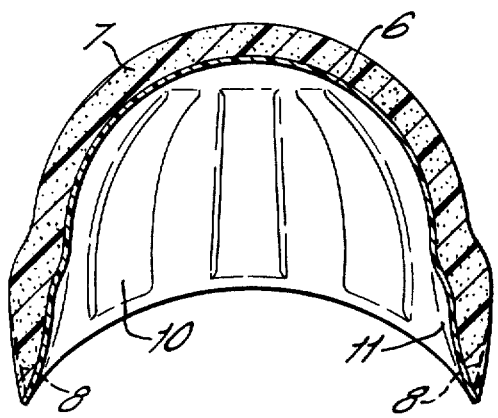

In FIG. 5, which is a diagrammatic cross section, there is shown inner shell 6 over which is molded the core or inner layer of shock absorbing material 7. The shock absorbing material 7 is molded onto inner shell 6 having a contour substantially as that shown in the drawing, but before mating the unit of inner shell 6 and core 7 to outer shell 4, part of the material of 7 is removed, the removed part being depicted by interrupted line 8, following which when outer shell 4 is placed over the unit comprising 6 and 7, the side portions 5 of outer shell 4 are drawn inwardly in the final assembly, the perimeters being welded together or fastened by means such as a bead or edging 9 as shown in FIG. 6.

Figure 6:
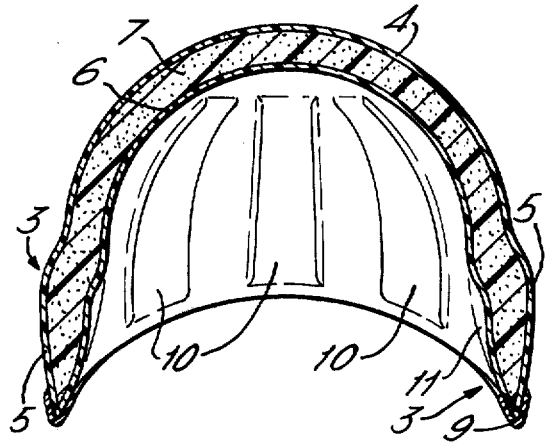

As will be seen when referring to FIG. 6, side portions 5 covering the temporal areas of the skull extend around the rear of the helmet to meet and insodoing provide a protection barrier for the occipital area of the head of a person using the helmet.

The illustrations of the invention in FIGS. 5 and 6 also contain representations of ribs, partitions or like raised portions 10 which serve to assist in stiffening the inner shell, and also make provision for ventilating passages 11.

Again referring to the drawings, FIGS. 7 and 8 are sectional views on a larger scale of a similar construction of helmet according to the invention where, likewise, the outer shell is designated numeral 4, the inner shell is designated numeral 6, and the molded core or inner layer of shock absorbing material designated numeral 7. The dome portion of the helmet is indicated generally by arrow 1 and the side portions indicated generally by arrow 3. As will be seen, the structure provided by the combination of outer and inner shells 4 and 6 respectively, together with the core of shock absorbing material 7 is continuous from the crown of the helmet to the perimeter thereof and that no break or discontinuity of any of the members forming the combination is present, and that no radical changes in section occur between the dome portion and the side portions of the helmet thereby providing for a stable shock absorbing structure.

FIG. 9 is a fragmentary view on a substantially horizontal plane in section showing an example of configuration of the inner shell 6, particularly the ribs or partitions adding strength to the inner shell.

As will be more particularly seen from FIGS. 5, 6 and 7, those parts of the side portions 3 which lie in the vicinity of the ears of a wearer of the helmet, are flared at 11 thereby providing comfortable accommodation for the ears of the wearer, and also providing for good aural access, yet at the same time maintaining the essential feature of continuity through the dome portion of the helmet into and to the perimeter of the side portions 3.

Referring more particularly to FIGS. 7 and 8, there is shown slots 12 formed at convenient points through inner shell 6. Slots 12 permit the accommodation of lugs 13 which pass through the slots into the core material 7 wherein the lugs 13 are anchored. Lugs 13 conveniently form securement points for a head band, illustrated by interrupted lines 14 in FIG. 8. An occipital strap is also indicated in interrupted lines and indicated by numeral 15, strap 15 being secured or forming part of head band 14.

Additional slots are formed or provided in the lower portions of inner shell 6, one of said slots being shown in FIG. 8 and having reference numeral 16. A slot 16 is provided on each side of the helmet and the slots accommodate a chin strap shown by interrupted lines 17. Preferably, chin strap 17 is anchored within the shock absorbing material 7.

I claim:

1. A method of producing a protective helmet comprising placing an inner shell having a dome portion and downwardly extending side portions on a die, positioning a further die so that a cavity is provided between the outer surface of the inner shell and the further die, filling the cavity with prefoamed beads of polystyrene of selected density, applying direct steam heat to said beads to expand said beads and create a continuous homogeneous layer of shock absorbing material extending over the whole outer surface of the inner shell and physically adhered to it, and removing the inner shell with the adhered layer of shock absorbing material from said die and said further die.

2. A method as claimed in claim 1 wherein slots are cut through the inner shell, and lugs are anchored through said slots and into said layer of shock absorbing material for attachment of a head-band.

3. A method as claimed in claim 2 wherein subsequent to the formation of said layer of shock absorbing material and attachment of said lugs, an outer covering is applied to the outer surface of the shock absorbing material.

4. A method as claimed in claim 1 including the step of forming the inner surface of the inner shell with recesses at the position which will lie in the vicinity of the ears of the wearer to provide for comfort and aural acuity.

5. A method as claimed in claim 1 wherein a chin strap anchorage is provided within or on the outer surface of the layer of shock absorbing material.

6. A method as claimed in claim 3 further including the step of applying an edge beading to reinforce and finish the helmet edge.

7. A method as claimed in claim 3 further including the step of improving the strength and shock absorption of the helmet by bonding the outer covering to the shock absorbing padding.

* * * * *